United States Patent
Kammachi Sreedhar et al.

(10) Patent No.: US 12,547,585 B2
(45) Date of Patent: Feb. 10, 2026

(54) HANDLING TRACKS IN MULTIPLE FILES

(71) Applicant: Nokia Technologies Oy, Espoo (FI)

(72) Inventors: Kashyap Kammachi Sreedhar, Tampere (FI); Miska Matias Hannuksela, Tampere (FI); Emre Baris Aksu, Tampere (FI); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/618,012

(22) Filed: Mar. 27, 2024

(65) Prior Publication Data

US 2024/0338343 A1 Oct. 10, 2024

Related U.S. Application Data

(60) Provisional application No. 63/457,592, filed on Apr. 6, 2023.

(51) Int. Cl.
*G06F 16/11* (2019.01)
*G06F 16/14* (2019.01)

(52) U.S. Cl.
CPC .......... *G06F 16/116* (2019.01); *G06F 16/148* (2019.01)

(58) Field of Classification Search
CPC .............................. G06F 16/116; G06F 16/148
USPC ........................................................ 707/756
See application file for complete search history.

(56) References Cited

U.S. PATENT DOCUMENTS

| | | | | |
|---|---|---|---|---|
| 5,047,918 | A * | 9/1991 | Schwartz | G06F 16/16 707/999.203 |
| 9,652,774 | B2 * | 5/2017 | Cappio | G06Q 30/02 |
| 10,762,060 | B1 * | 9/2020 | Faulkner | G06F 7/14 |
| 2008/0189695 | A1 * | 8/2008 | Andersson | H04M 1/72406 717/168 |

(Continued)

FOREIGN PATENT DOCUMENTS

| | | | | |
|---|---|---|---|---|
| CN | 103957448 A | * | 7/2014 | ........... H04N 21/433 |
| CN | 109194886 A | * | 1/2019 | ............. H04N 5/262 |

(Continued)

OTHER PUBLICATIONS

Internet Engineering Task Force (IETF) Request for Comments: 7230 "Hypertext Transfer Protocol (HTTP/1.1): Message Syntax and Routing" Jun. 2014.

(Continued)

*Primary Examiner* — Phuong Thao Cao
(74) *Attorney, Agent, or Firm* — McCarter & English, LLP

(57) ABSTRACT

An apparatus may be configured to: obtain a first bitstream and a second bitstream; generate a first file comprising a first track and one or more identifiers associated with the first file, wherein the first track comprises the first bitstream; and generate a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file.

20 Claims, 9 Drawing Sheets

(56) References Cited

U.S. PATENT DOCUMENTS

| | | | | |
|---|---|---|---|---|
| 2011/0111850 | A1* | 5/2011 | Beerhorst | G07F 17/3244 |
| | | | | 463/35 |
| 2011/0296305 | A1* | 12/2011 | Orr | G06F 16/483 |
| | | | | 715/810 |
| 2012/0197966 | A1* | 8/2012 | Wolf | H04L 65/80 |
| | | | | 709/203 |
| 2013/0097014 | A1* | 4/2013 | Martin | G06Q 30/0247 |
| | | | | 705/14.66 |
| 2015/0081777 | A1* | 3/2015 | Laine | H04N 21/854 |
| | | | | 709/203 |
| 2019/0392161 | A1* | 12/2019 | Neidig | G06F 21/604 |
| 2020/0167099 | A1* | 5/2020 | Haba | G06F 3/128 |
| 2022/0245732 | A1* | 8/2022 | Dixon | G06F 16/27 |
| 2022/0309035 | A1* | 9/2022 | Funamoto | H04N 21/858 |
| 2024/0080487 | A1* | 3/2024 | Hu | H04N 21/434 |

FOREIGN PATENT DOCUMENTS

| | | | | | |
|---|---|---|---|---|---|
| CN | 113873176 | A | * | 12/2021 | H04N 21/440281 |
| CN | 114827098 | A | * | 7/2022 | H04N 23/60 |
| CN | 114845151 | A | * | 8/2022 | H04N 21/43076 |
| KR | 20010069124 | A | * | 7/2001 | G06F 16/40 |
| KR | 100959585 | B1 | * | 5/2010 | G11B 20/10 |
| KR | 20220108063 | A | * | 8/2022 | |

OTHER PUBLICATIONS

Independent Submission Request for Comments: 8216 "HTTP Live Streaming" Aug. 2017.

International Standard ISO/IEC 23009-1 "Information Technology—Dynamic adaptive streaming over HTTP (DASH)—Part 1 Media Presentation Description and Segment Formats" Third Edition Aug. 2019.

3GPP TS 26.234 Version 15.1.0 Release 15 "Universal Mobile Telecommunications System (UMTS); LTE; Transparent end-to-end Packet Switched Streaming Service (PSS); Protocols and Codecs" ETSI TS 126 234 V15.1.0. Oct. 2018.

3GPP TS 26.247 Version 16.3.0 Release 16 Universal Mobile Telecommunications System (UMTS); LTE; Transparent End-to-end Packet Switched Streaming Service (PSS); Progressive Download and Dynamic Adaptive Streaming Over HTTP (3GP-DASH) ETSI TS 126 247 V16.3.0. Sep. 2020.

* cited by examiner

```
aligned(8) class EditListBox extends FullBox('elst', version,
   flags) {
unsigned int(32) entry_count;
        for (i=1; i <= entry_count; i++) {
            if (version==1) {
                unsigned int(64) segment_duration;
                int(64) media_time;
            } else { // version==0
                unsigned int(32) segment_duration;
                int(32) media_time;
            }
            int(16) media_rate_integer;
            int(16) media_rate_fraction = 0;
        }
   }
```

```
aligned(8)    class    TrackGroupBox    extends    Box('trgr')    {
} aligned(8)    class    TrackGroupTypeBox(unsigned    int(32)
track_group_type) extends FullBox(track_group_type, version =
0,            flags            =            0)
{
    unsigned            int(32)            track_group_id;
    // the remaining data may be specified for a particular
track_group_type
}
```

```
aligned(8) class EntityToGroupBox(grouping_type, version,
flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
```

```
aligned(8) class MovieHeaderBox extends FullBox('mvhd', version, 0) {
    if (version==2) {
        unsigned int(64) creation_time;
        unsigned int(64) modification_time;
        unsigned int(32) timescale;
        unsigned int(64) duration;
        signed int(8) unique_ids_count_minus1;
        for (int i=0; i < unique_ids_count_minus1 + 1;i++){
            unsigned int(128) unique_ID[i];
        }
    } else if (version==1) {
        unsigned int(64) creation_time;
        unsigned int(64) modification_time;
        unsigned int(32) timescale;
        unsigned int(64) duration;
    } else { // version==0
        unsigned int(32) creation_time;
        unsigned int(32) modification_time;
        unsigned int(32) timescale;
        unsigned int(32) duration;
    }
    template int(32) rate = 0x00010000;   // typically 1.0
    template int(16) volume = 0x0100; // typically, full volume
    const bit(16)    reserved = 0;
    const unsigned int(32)[2]  reserved = 0;
    template int(32)[9]   matrix =
        { 0x00010000,0,0,0,0x00010000,0,0,0,0x40000000 };
        // Unity matrix
    bit(32)[6] pre_defined = 0;
    unsigned int(32) next_track_ID;
}
```

```
aligned(8) class MovieHeaderExtensionBox extends FullBox('mvhe',
version, 0) {
    signed int(8) unique_ids_count_minus1;     820
    for (int i=0; i < unique_ids_count_minus1 + 1;i++){
        unsigned int(128) unique_ID[i];
    }
}
```

```
┌─────────────────────────────┐
│ obtain a first bitstream and a │  910
│ second bitstream            │
└─────────────────────────────┘
              ↓
┌─────────────────────────────┐
│ generate a first file comprising a │
│ first track and one or more │
│ identifiers associated with the │  920
│ first file, wherein the first track │
│ comprises the first bitstream │
└─────────────────────────────┘
              ↓
┌─────────────────────────────┐
│ generate a second file      │
│ comprising a second track and │
│ one or more identifiers     │
│ associated with the second file, │
│ wherein the second track    │
│ comprises the second        │
│ bitstream,                  │
│                             │
│ wherein at least one of the one │
│ or more identifiers associated │
│ with the first file matches at │  930
│ least one of the one or more │
│ identifiers associated with the │
│ second file, wherein a match │
│ between the at least one of the │
│ one or more identifiers     │
│ associated with the first file and │
│ the at least one of the one or │
│ more identifiers associated with │
│ the second file is configured to │
│ indicate that the first file is │
│ capable of combination with the │
│ second file                 │
└─────────────────────────────┘
```

FIG. 9

HANDLING TRACKS IN MULTIPLE FILES

PRIORITY BENEFIT

This application claims priority under 35 U.S.C. 119(e)(1) to U.S. Provisional Patent Application No. 63/457,592, filed Apr. 6, 2023, which is hereby incorporated by reference in its entirety.

TECHNICAL FIELD

The example and non-limiting embodiments relate generally to tracks stored in different files and, more particularly, to identifiers associated with those tracks.

BACKGROUND

It is known, in the Common Media Application Format (CMAF) and in dynamic adaptive streaming over HTTP (DASH) files, to store tracks in separate files.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: obtain a first bitstream and a second bitstream; generate a first file comprising a first track and one or more identifiers associated with the first file, wherein the first track comprises the first bitstream; and generate a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, a method comprising: obtaining a first bitstream and a second bitstream; generating a first file comprising a first track and one or more identifiers associated with the first file, wherein the first track comprises the first bitstream; and generating a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, an apparatus comprising means for performing: obtaining a first bitstream and a second bitstream; generating a first file comprising a first track and one or more identifiers associated with the first file, wherein the first track comprises the first bitstream; and generating a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, a non-transitory computer-readable medium comprising program instructions stored thereon for performing at least the following: causing obtaining of a first bitstream and a second bitstream; generating a first file comprising a first track and one or more identifiers associated with the first file, wherein the first track comprises the first bitstream; and generating a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, an apparatus comprising: at least one processor; and at least one memory storing instructions that, when executed by the at least one processor, cause the apparatus at least to: obtain a first file, wherein the first file comprises a first track and one or more identifiers associated with the first file, wherein the first track comprises a first bitstream; obtain a second file, wherein the second file comprises a second track and one or more identifiers associated with the second file, wherein the second track comprises a second bitstream; and determine whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, a method comprising: obtaining a first file, wherein the first file comprises a first track and one or more identifiers associated with the first file, wherein the first track comprises a first bitstream; obtaining a second file, wherein the second file comprises a second track and one or more identifiers associated with the second file, wherein the second track comprises a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, an apparatus comprising means for performing: obtaining a first file, wherein the first file comprises a first track and one or more identifiers associated with the first file, wherein the first track comprises a first bitstream; obtaining a second file, wherein the second file comprises a second track and one or more identifiers associated with the second file, wherein the second track comprises a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file is configured to indicate that the first file is capable of combination with the second file.

In accordance with one aspect, a non-transitory computer-readable medium comprising program instructions stored thereon for performing at least the following: causing obtaining of a first file, wherein the first file comprises a first track and one or more identifiers associated with the first file, wherein the first track comprises a first bitstream; causing obtaining of a second file, wherein the second file comprises a second track and one or more identifiers associated with the second file, wherein the second track comprises a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file is configured to indicate that the first file is capable of combination with the second file.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 3 is a diagram illustrating features as described herein;

FIG. 4 is a diagram illustrating features as described herein;

FIG. 5 is a diagram illustrating features as described herein;

FIG. 7 is a diagram illustrating features as described herein;

FIG. 8 is a diagram illustrating features as described herein;

FIG. 9 is a flowchart illustrating steps as described herein; and

DETAILED DESCRIPTION OF EMBODIMENTS

Figure 1:
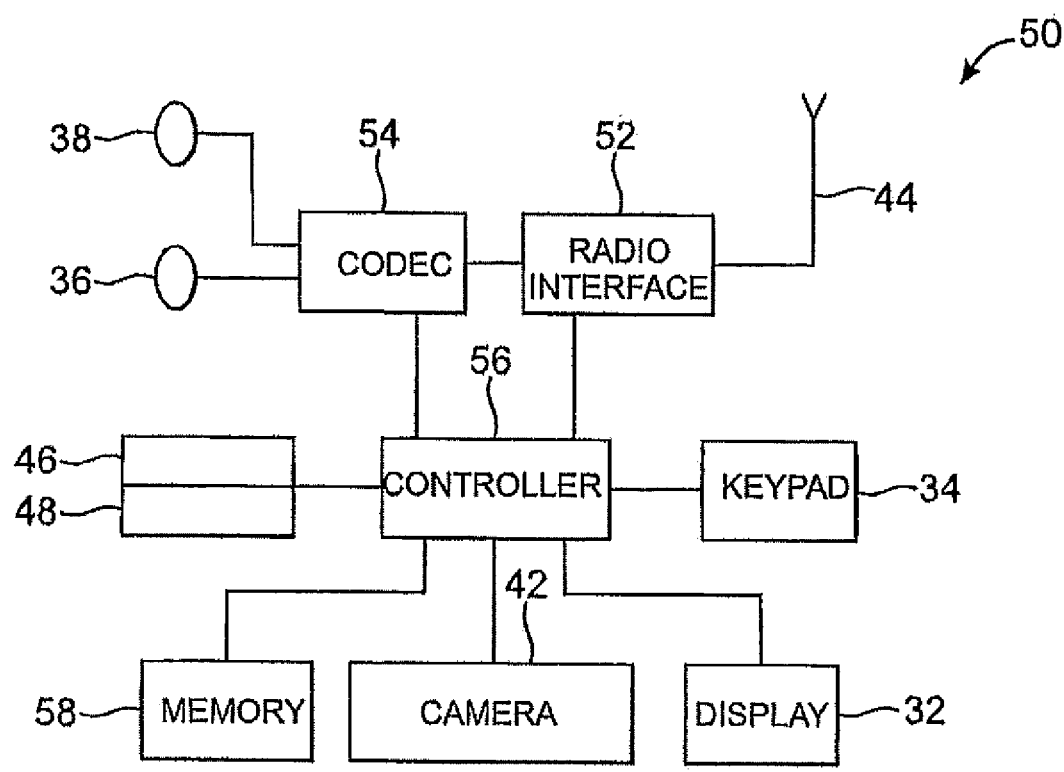
FIG. 1 is a block diagram of one possible and non-limiting example system in which the example embodiments may be practiced.

The following abbreviations that may be found in the specification and/or the drawing figures are defined as follows:

3GPP third generation partnership project
4CC four character code
4G fourth generation
5G fifth generation
5GC 5G core network
AAC advanced audio coding
AHS adaptive HTTP streaming
AR augmented reality
AVC advanced video coding
CDMA code division multiple access
CDN content delivery network
CMAF common media application format
CPU central processing unit
cRAN cloud radio access network
DASH dynamic adaptive streaming over HTTP
DRM digital right management
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDMA frequency division multiple access
gNB (or gNodeB) base station for 5G/NR, i.e., a node providing NR user plane and control plane protocol terminations towards the UE, and connected via the NG interface to the 5GC
GPU graphical processing unit
GSM global systems for mobile communications
HEVC high efficiency video coding
HLS HTTP live streaming
HMD head-mounted display
HTTP hypertext transfer protocol
IEEE Institute of Electrical and Electronics Engineers
IETF internet engineering task force
IMD integrated messaging device
IMS instant messaging service
IoT Internet of Things
ISO international standards organization
ISOBMFF ISO base media file format
LTE long term evolution
MMS multimedia messaging service
MPD media presentation description
MPEG Moving Picture Experts Group
MPEG-I Moving Picture Experts Group immersive codec family
MR mixed reality
MSE media source extension
NAL network abstraction layer
NAT network address translator
ng or NG new generation
ng-eNB or NG-eNB new generation eNB
NR new radio
N/W or NW network
O-RAN open radio access network
PC personal computer
PDA personal digital assistant
PSNR peak signal-to-noise ratio
PSS packet-switched streaming service
RTP real-time protocol
SAP stream access point
SMS short messaging service
TCP-IP transmission control protocol-internet protocol
TDMA time division multiple access
TTML timed text markup language
UDP user datagram protocol
UE user equipment (e.g., a wireless, typically mobile device)
UMTS universal mobile telecommunications system
URL uniform resource locator
USB universal serial bus
UUID universally unique identifier
VNR virtualized network function VR virtual reality
WebVTT web video text tracks format
WLAN wireless local area network
XML extensible markup language
XR extended reality The following describes suitable apparatus and possible mechanisms for practicing example embodiments of the present disclosure. Accordingly, reference is first made to FIG. 1, which shows an example block diagram of an apparatus 50. The apparatus may be configured to perform various functions such as, for example, gathering information by one or more sensors, encoding and/or decoding information, receiving and/or transmitting information, analyzing information gathered or received by the apparatus, or the like. A device configured to encode a video scene may (optionally) comprise one or more microphones for capturing the scene and/or one or more sensors, such as cameras, for capturing information about the physical environment in which the scene is captured. Alternatively, a device configured to encode a video scene may be configured to receive information about an environment in which a scene is captured and/or a simulated environment. A device configured to decode and/or render the video scene may be configured to receive a Moving Picture Experts Group immersive codec family (MPEG-I) bitstream comprising the encoded video scene. A device configured to decode and/or render the video scene may comprise one or more speakers/audio transducers and/or displays, and/or may be configured to transmit a decoded scene or signals to a device comprising one or more speakers/audio transducers and/or displays. A device configured to decode and/or render the video scene may comprise a user equipment, a head/mounted display, or another device capable of rendering to a user an AR, VR MR and/or extended reality (XR) experience.

The electronic device 50 may for example be a mobile terminal or user equipment of a wireless communication system. Alternatively, the electronic device may be a computer or part of a computer that is not mobile. It should be appreciated that example embodiments of the present disclosure may be implemented within any electronic device or apparatus which may process data. The electronic device 50 may comprise a device that can access a network and/or cloud through a wired or wireless connection. The electronic device 50 may comprise one or more processors 56, one or more memories 58, and one or more transceivers 52 interconnected through one or more buses. The one or more processors 56 may comprise a central processing unit (CPU) and/or a graphical processing unit (GPU). Each of the one or more transceivers 52 includes a receiver and a transmitter. The one or more buses may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers may be connected to one or more antennas 44. The one or more memories 58 may include computer program code. The one or more memories 58 and the computer program code may be configured to, with the one or more processors 56, cause the electronic device 50 to perform one or more of the operations as described herein.

The electronic device 50 may connect to a node of a network. The network node may comprise one or more processors, one or more memories, and one or more transceivers interconnected through one or more buses. Each of the one or more transceivers includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the network node to perform one or more of the operations as described herein.

The electronic device 50 may comprise a microphone 36 or any suitable audio input which may be a digital or analogue signal input. The electronic device 50 may further comprise an audio output device 38 which in example embodiments of the present disclosure may be any one of: an earpiece, speaker, or an analogue audio or digital audio output connection. The electronic device 50 may also comprise a battery (or in other example embodiments the device may be powered by any suitable mobile energy device such as solar cell, fuel cell, or clockwork generator). The electronic device 50 may further comprise a camera 42 or other sensor capable of recording or capturing images and/or video. Additionally or alternatively, the electronic device 50 may further comprise a depth sensor. The electronic device 50 may further comprise a display 32. The electronic device 50 may further comprise an infrared port for short range line of sight communication to other devices. In other example embodiments of the present disclosure, the apparatus 50 may further comprise any suitable short-range communication solution such as for example a BLUETOOTH™ wireless connection or a USB/firewire wired connection.

It should be understood that an electronic device 50 configured to perform example embodiments of the present disclosure may have fewer and/or additional components, which may correspond to what processes the electronic device 50 is configured to perform. For example, an apparatus configured to encode a video might not comprise a speaker or audio transducer and may comprise a microphone, while an apparatus configured to render the decoded video might not comprise a microphone and may comprise a speaker or audio transducer.

Referring now to FIG. 1, the electronic device 50 may comprise a controller 56, processor or processor circuitry for controlling the apparatus 50. The controller 56 may be connected to memory 58 which in example embodiments of the present disclosure may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The electronic device 50 may further comprise a card reader 48 and a smart card 46, for example a UICC and UICC reader, for providing user information and being suitable for providing authentication information for authentication and authorization of the user/electronic device 50 at a network. The electronic device 50 may further comprise an input device 34, such as a keypad, one or more input buttons, or a touch screen input device, for providing information to the controller 56.

The electronic device 50 may comprise radio interface circuitry 52 connected to the controller and suitable for generating wireless communication signals for example for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The electronic device 50 may comprise a microphone 38, camera 42, and/or other sensors capable of recording or detecting audio signals, image/video signals, and/or other information about the local/virtual environment, which are then passed to the codec 54 or the controller 56 for processing. The electronic device 50 may receive the audio/image/video signals and/or information about the local/virtual environment for processing from another device prior to transmission and/or storage. The electronic device 50 may also receive either wirelessly or by a wired connection the audio/image/video signals and/or information about the local/virtual environment for encoding/decoding. The structural elements of electronic device 50 described above represent examples of means for performing a corresponding function.

The memory 58 may be of any type suitable to the local technical environment and may be implemented using any suitable data storage technology, such as semiconductor-based memory devices, flash memory, magnetic memory devices and systems, optical memory devices and systems, fixed memory and removable memory. The memory 58 may be a non-transitory memory. The memory 58 may be means for performing storage functions. The controller 56 may be or comprise one or more processors, which may be of any type suitable to the local technical environment, and may include one or more of general-purpose computers, special purpose computers, microprocessors, digital signal processors (DSPs) and processors based on a multi-core processor architecture, as non-limiting examples. The controller 56 may be means for performing functions.

The electronic device 50 may be configured to perform capture of a volumetric scene according to example embodiments of the present disclosure. For example, the electronic device 50 may comprise a camera 42 or other sensor capable of recording or capturing images and/or video. The electronic device 50 may also comprise one or more transceivers 52 to enable transmission of captured content for processing at another device. Such an electronic device 50 may or may not include all the modules illustrated in FIG. 1.

The electronic device 50 may be configured to perform processing of volumetric video content according to example embodiments of the present disclosure. For example, the electronic device 50 may comprise a controller 56 for processing images to produce volumetric video content, a controller 56 for processing volumetric video content to project 3D information into 2D information, patches, and auxiliary information, and/or a codec 54 for encoding 2D information, patches, and auxiliary information into a bitstream for transmission to another device with radio interface 52. Such an electronic device 50 may or may not include all the modules illustrated in FIG. 1.

The electronic device 50 may be configured to perform encoding or decoding of 2D information representative of volumetric video content according to example embodiments of the present disclosure. For example, the electronic device 50 may comprise a codec 54 for encoding or decoding 2D information representative of volumetric video content. Such an electronic device 50 may or may not include all the modules illustrated in FIG. 1.

The electronic device 50 may be configured to perform rendering of decoded 3D volumetric video according to example embodiments of the present disclosure. For example, the electronic device 50 may comprise a controller for projecting 2D information to reconstruct 3D volumetric video, and/or a display 32 for rendering decoded 3D volumetric video. Such an electronic device 50 may or may not include all the modules illustrated in FIG. 1.

Figure 2:
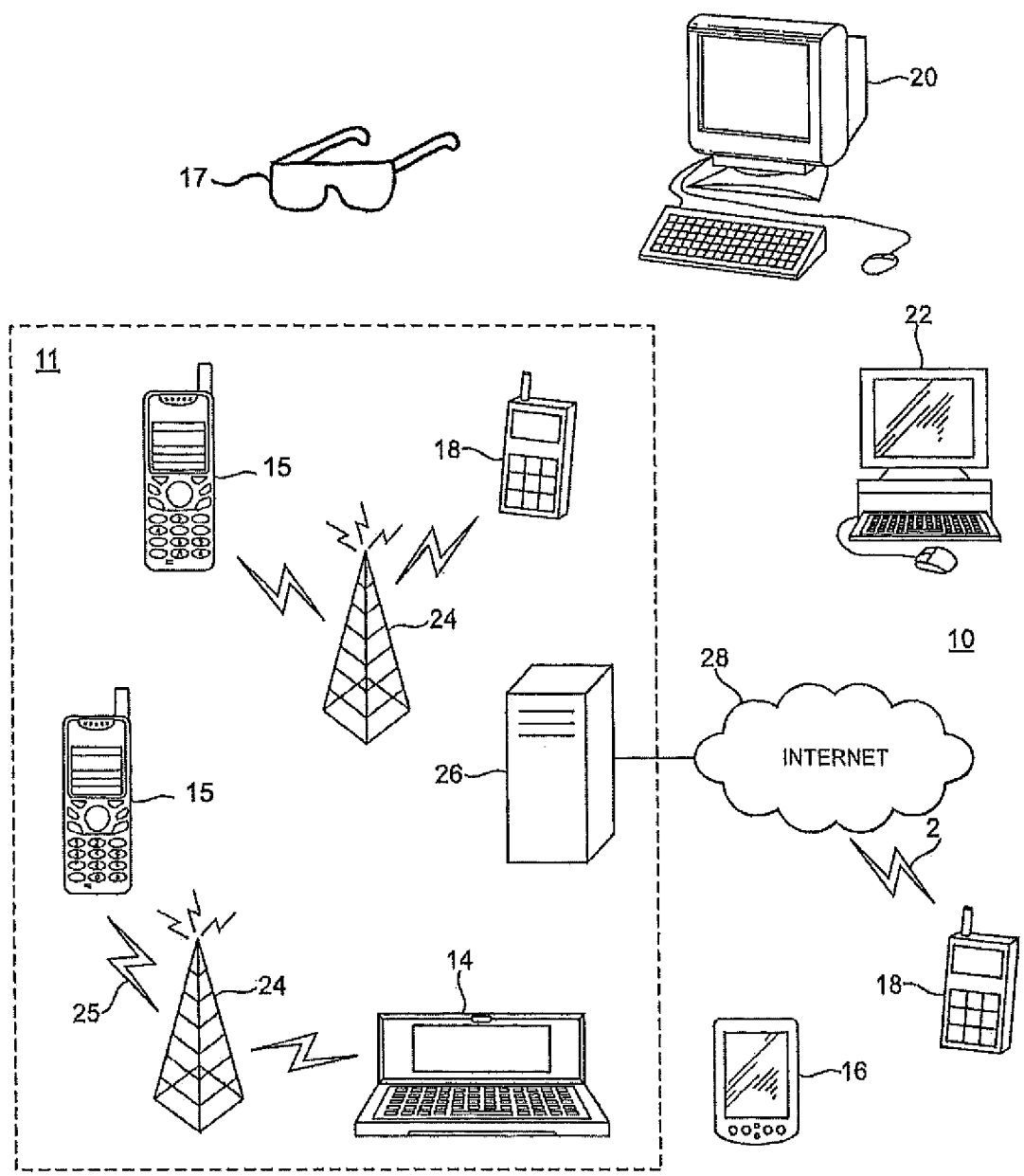
FIG. 2 is a block diagram of one possible and non-limiting exemplary system in which the example embodiments may be practiced.

With respect to FIG. 2, an example of a system within which example embodiments of the present disclosure can be utilized is shown. The system 10 comprises multiple communication devices which can communicate through one or more networks. The system 10 may comprise any combination of wired or wireless networks including, but not limited to a wireless cellular telephone network (such as a GSM, UMTS, E-UTRA, LTE, CDMA, 4G, 5G network etc.), a wireless local area network (WLAN) such as defined by any of the IEEE 802.x standards, a BLUETOOTH™ personal area network, an Ethernet local area network, a token ring local area network, a wide area network, and/or the Internet. A wireless network may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors and memories, and also such virtualized entities create technical effects.

It may also be noted that operations of example embodiments of the present disclosure may be carried out by a plurality of cooperating devices (e.g. cRAN).

The system 10 may include both wired and wireless communication devices and/or electronic devices suitable for implementing example embodiments of the present disclosure.

For example, the system shown in FIG. 2 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an apparatus 15, a combination of a personal digital assistant (PDA) and a mobile telephone 14, a PDA 16, an integrated messaging device (IMD) 18, a desktop computer 20, a notebook computer 22, and a head-mounted display (HMD) 17. The electronic device 50 may comprise any of those example communication devices. In an example embodiment of the present disclosure, more than one of these devices, or a plurality of one or more of these devices, may perform the disclosed process (es). These devices may connect to the internet 28 through a wireless connection 2.

The example embodiments of the present disclosure may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding. The example embodiments of the present disclosure may also be implemented in cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Some or further apparatus may send and receive calls and messages and communicate with service providers through a wireless connection 25 to a base station 24, which may be, for example, an eNB, gNB, access point, access node, other node, etc. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), BLUETOOTH™, IEEE 802.11, 3GPP Narrowband IoT and any similar wireless communication technology. A communications device involved in implementing various example embodiments of the present disclosure may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, which may be a MPEG-I bitstream, from one or several senders (or transmitters) to one or several receivers.

Having thus introduced one suitable but non-limiting technical context for the practice of the example embodiments of the present disclosure, example embodiments will now be described with greater specificity.

Features as described herein generally relate to tracks included in a file. ISO/IEC 14996-12, also known as the ISOBMFF file format, encapsulates media streams into tracks of a file. It typically assumes that all tracks of a media presentation are contained in a single file. A single movie header documents all tracks included in the file, and also provides the relationship between these tracks for presentation purposes. Encapsulation of a bitstream into a file may be defined as including or enclosing the bitstream into the file, possibly with metadata that may, for example, assist in random accessing of the bitstream.

A file packager is a logical entity which prepares the media for adaptive bitrate playback. It may take a media stream or an ISOBMFF file as input, and may create fragmented MP4 files, common media application format (CMAF) files, or files suitable for delivery using an MPEG-DASH like mechanism.

In streaming applications, the information that is contained in a movie header for many tracks needs to be populated to the manifest such that the client can, early on, select the tracks based on this information. However, some of the file format principles do not carry forward to CMAF or dynamic adaptive streaming over HTTP (DASH), because CMAF and DASH heavily rely on the concept of late binding (i.e. each track is stored in a separate file). In practical use cases, each media stream is encapsulated and packaged into its own file. This process is typically used when the media streams come from different origins and/or use different encoders, and it also helps in parallelizing the media generation pipeline. However, having media streams in their own files comes with different challenges.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15), and High Efficiency Video Coding standard (HEVC or H.265/HEVC). Files that conform to ISOBMFF are casually referred to as MP4 files, and may have .mp4 as the file name extension.

Some concepts, structures, and specifications of the ISOBMFF are described below as an example of a container file format, based on which some example embodiments of the present disclosure may be implemented. However, the description related to the ISOBMFF is not limiting; example embodiments of the present disclosure may be implemented with respect to other file formats. The ISOBMFF is merely one possible basis on top of which at least some example embodiments of the present disclosure may be partly or fully realized.

The ISOBMFF is designed to contain timed media information in a flexible, extensible format that facilitates interchange, management, editing, and presentation of the media. This presentation may be 'local' to the system containing the presentation, or may be via a network or other stream delivery mechanism. The file structure is object-oriented; a file can be decomposed into constituent objects very simply, and the structure of the objects can be inferred directly from their type(s). The ISOBMFF is designed to be independent of any particular network protocol, while enabling efficient support for them in general. The ISOBMFF is a base format for media file formats.

The ISOBMFF supports the exchange of presentations in the following principle ways: as a single file (e.g. on exchangeable media such as storage media, or as a download); as a series of segments, preceded by an initialization segment; and/or transformed by supporting structures, called hint tracks, into a streaming protocol, such as the internet engineering task force (IETF) real-time protocol (RTP) or an MPEG-2 transports stream.

A presentation file logically includes all its segments. The file format supports transformation of media data into a streaming protocol format, as well as local playback. The process of sending protocol data units is time-based, just like the display of time-based data, and is therefore suitably described by a time-based format. A file or 'movie' that supports streaming includes information about the data units to stream. This information is included in additional tracks of the file called "hint" tracks. Hint tracks may also be used to record a stream; these are called Reception Hint Tracks, to differentiate them from plain (or server, or transmission) hint tracks.

A basic building block in the ISO base media file format is called a box. Each box has a header and a payload. The box header indicates the type of the box and the size of the box in terms of bytes. The box type is typically identified by an unsigned 32-bit integer, interpreted as a four character code (4CC). A box may enclose other boxes, and the ISOBMFF specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes.

In files conforming to the ISOBMFF, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format and, optionally, its encapsulation to the ISOBMFF.

A hint track refers to hint samples, which may contain cookbook instructions for constructing packets for transmission over an indicated communication protocol.

A timed metadata track may refer to samples describing referred media and/or hint samples.

The 'trak' box includes, in its hierarchy of boxes, the SampleDescriptionBox, which gives detailed information about the coding type used, and any initialization information needed for that coding. The SampleDescriptionBox contains an entry-count and as many sample entries as the entry-count indicates. The format of sample entries is track-type specific, but derived from generic classes (e.g. VisualSampleEntry, AudioSampleEntry, etc.). Which type of sample entry form is used for derivation of the track-type specific sample entry format may be determined by the media handler of the track.

The track reference mechanism may be used to associate tracks with each other. The TrackReferenceBox includes box(es), each of which provides a reference from the containing track to a set of other tracks. These references are labeled through the box type (e.g., the four-character code of the box) of the contained box(es).

The ISOBMFF contains three mechanisms for timed metadata that may be associated with particular samples: sample groups, timed metadata tracks, and/or sample auxiliary information. A derived specification may provide similar functionality with one or more of these three mechanisms.

A sample grouping in the ISOBMFF may be defined as an assignment of each sample in a track to be a member of one sample group, based on a grouping criterion. A sample group in a sample grouping is not limited to being contiguous samples, and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used, for example, to indicate a sub-type of the grouping.

In ISOMBFF, an edit list provides a mapping between the presentation timeline and the media timeline. Among other things, an edit list provides for the linear offset of the presentation of samples in a track, provides for the indication of empty times (i.e. within a timeline), and/or provides for a particular sample to be presented/dwelled on for a certain period of time. The presentation timeline may be, accordingly, modified to provide for looping, such as for the looping of videos of the various regions of the scene. One example of the box that includes the edit list, the EditListBox, is provided described in FIG. 3.

In ISOBMFF, an EditListBox may be contained in an EditBox, which may be contained in a TrackBox ('trak').

In the example of FIG. 3, illustrating the edit list box, flags (310) specifies the repetition of the edit list. By way of example, setting a specific bit within the box flags (e.g. the least significant bit, i.e. flags & 1 in ANSI-C notation, where '&' indicates a bit-wise AND operation) equal to 0 specifies that the edit list is not repeated, while setting the specific bit (i.e. flags & 1 in ANSI-C notation) equal to 1 specifies that the edit list is repeated. The values of the box flags (310) greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list, such that the edit list is repeated seamlessly.

In ISOBMFF, a Track group enables grouping of tracks based on certain characteristics, or that the tracks within a group have a particular relationship. Track grouping, however, does not allow any image items in the group.

Referring now to FIG. 4, illustrated is an example of the syntax of a TrackGroupBox in ISOBMFF. track_group_type (410) indicates the grouping_type, and may be set to 'msrc', which indicates that this track belongs to a multi-source presentation. Alternatively, track_group_type may be set to a registered value, or a value from a derived specification or registration. The tracks that have the same value of track_group_id (420) within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from the value of track_group_id associated with the tracks of the other participant.

The pair of track_group_id (420) and track_group_type (410) identifies a track group within the file. The tracks that contain a particular TrackGroupTypeBox having the same value of track_group_id and track_group_type belong to the same track group.

The Entity grouping is similar to track grouping, but enables grouping of both tracks and image items in the same group.

Referring now to FIG. 5, illustrated is an example of the syntax of an EntityToGroupBox in ISOBMFF. group_id (510) is a non-negative integer assigned to the particular grouping that shall not be equal to any group_id value of any other EntityToGroupBox, any item_ID value of the hierarchy level (e.g. file, movie, or track) that contains the GroupsListBox, or any track_ID value (e.g. when the GroupsListBox is contained in the file level). num_entities_in_group (520) specifies the number of entity_id (530) values mapped to this entity group. entity_id (530) is resolved to an item, when an item with item_ID equal to entity_id is present in the hierarchy level (e.g. file, movie, or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, the items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred to, and each one of them can be associated with a file name, and are uniquely identified with the file by item identifier (item_id), which is an integer value. The metadata items may be, for example, stored in the 'idat' box of the meta box, in an 'mdat' box, or in a separate file. If the metadata is located external to the file, then its location may be declared by the DataInformationBox (four-character code: 'dinf').

In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, for example to enable interleaving. An extent is a contiguous subset of the bytes of the resource. The resource may be formed by concatenating the extents.

Features as described herein may relate to Dynamic Adaptive Streaming with HTTP (MPEG-DASH). Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure, and is typically granted traversal of firewalls and network address translators (NAT), which makes it attractive for multimedia streaming applications.

Chunked HTTP delivery enables servers to respond to an HTTP GET request in multiple parts. However, chunked HTTP delivery does not remove the inherent encoding and encapsulation delay caused by creating self-standing movie fragments. Chunked HTTP delivery is specified in IETF RFC 7230.

Several commercial solutions for adaptive streaming over HTTP, such as MICROSOFT® Smooth Streaming, APPLE® Adaptive HTTP Live Streaming and ADOBE® Dynamic Streaming, have been launched, and standardization projects have been carried out. Adaptive HTTP streaming (AHS) was first standardized in Release 9 of the 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG, and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other, and may therefore be collectively referred to as DASH. Streaming systems similar to MPEG-DASH include, for example, HTTP Live Streaming (HLS), specified in the IETF RFC 8216. For a detailed description of said adaptive streaming system, all providing examples of a video streaming system wherein example embodiments of the present disclosure may be implemented, reference is made to the above standard documents. Example embodiments of the present disclosure are not limited to the above standard documents; rather, the description is given for one possible basis on top of which example embodiments of the present disclosure may be partly or fully realized.

In DASH, the multimedia content may be stored on an HTTP server, and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams, in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request. To play the content, the DASH client may obtain the MPD, for example by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using, for example, HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (e.g. with lower or higher bitrates) to maintain an adequate buffer.

In the context of DASH, the following definitions may be used.

A media content component or a media component may be defined as one continuous component of the media content with an assigned media component type that may be encoded individually into a media stream.

Media content may be defined as one media content period or a contiguous sequence of media content periods.

Media content component type may be defined as a single type of media content such as audio, video, or text.

A media stream may be defined as an encoded version of a media content component.

In DASH, a hierarchical data model is used to structure media presentation, as follows. A media presentation consists of a sequence of one or more Periods, where each Period contains one or more Groups, each Group contains one or more Adaptation Sets, each Adaptation Set contains one or more Representations, and each Representation consists of one or more Segments.

A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof, typically differing by the encoding choice (e.g. by bitrate, resolution, language, codec, etc.). The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range, which are specified by an MPD.

An Initialization Segment may be defined as a Segment containing metadata that is necessary to present the media streams encapsulated in Media Segments. In ISOBMFF based segment formats, an Initialization Segment may comprise the Movie Box ('moov'), which might not include metadata for any samples (i.e. any metadata for samples is provided in 'moof' box(es)).

A Media Segment contains a certain duration of media data for playback at a normal speed; such duration is referred to as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client, since a Segment is a discrete unit of generating media data for DASH. Content generation is typically done in such a manner that a whole Segment of media data is made available for a server. Furthermore, many client implementations use a Segment as the unit for GET requests. Thus, in typical arrangements for live services, a Segment can be requested by a DASH client only when the whole duration of the Media Segment is available, as well as encoded and encapsulated into a Segment. For on-demand service, different strategies of selecting Segment duration may be used.

A Segment may be further partitioned into Subsegments (e.g. to enable downloading segments in multiple parts). Subsegments may be required to contain complete access units. Subsegments may be indexed by a Segment Index box, which may contain information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using a byte range HTTP request. If a relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment, and therefore may prevent a possible initial download delay.

DASH supports rate adaptation by dynamically requesting Media Segments from different Representations within an Adaptation Set to match varying network bandwidth. When a DASH client switches up/down Representation, coding dependencies within a Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, an SAP is specified as a position in a Representation that enables playback of a media stream to be started using only the information contained in the Representation data starting from that position onwards (preceded by initializing data in the Initialisation Segment, if any). Hence, Representation switching may be performed in SAP.

An end-to-end system for DASH may be described as follows. The media content is provided by an origin server, which may be a conventional web (HTTP) server. The origin server may be connected with a Content Delivery Network (CDN), over which the streamed content is delivered to and stored in edge servers. The MPD allows signaling of multiple base URLs for the content, which may be used to announce the availability of the content in different edge servers. Alternatively, the content server may be directly connected to the Internet. Web proxies may reside on the path of routing the HTTP traffic between the DASH clients and the origin or edge server from which the content is requested. Web proxies cache HTTP messages, and hence may serve clients' requests with the cached content. They are commonly used by network service providers, since they reduce the required network bandwidth from the proxy towards origin or edge servers. For end-users, HTTP caching provides shorter latency. DASH clients are connected to the Internet through an access network, such as a mobile cellular network. The mobile network may comprise mobile edge servers or mobile edge cloud, operating similarly to a CDN edge server and/or web proxy.

Figure 6:
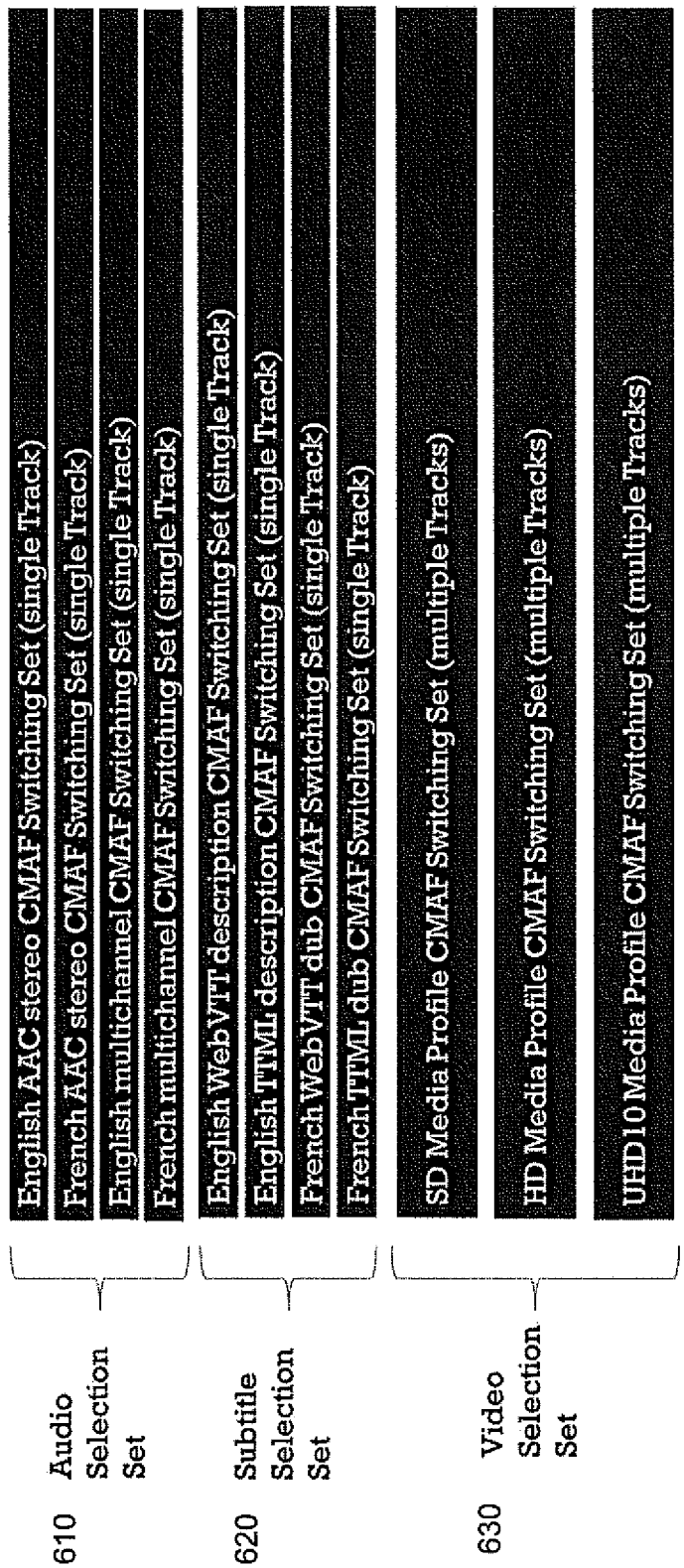
FIG. 6 is a diagram illustrating features as described herein.

Features as described herein may relate to the alignment (or lack thereof) of ISOBMFF/DASH/CMAF terminology, concepts and solutions. Some of the file format principles do not carry forward to CMAF or DASH, because CMAF and DASH heavily rely on the concept of late binding (i.e. each track is stored in a separate file). This is shown in FIG. 6. At 610, the audio selection set comprises English advanced audio coding (AAC) stereo CMAF Switching Set (single Track); French AAC stereo CMAF Switching Set (single Track); English multichannel CMAF Switching Set (single Track); and French multichannel CMAF Switching Set (single Track). At 620, the subtitle selection set comprises English Web Video Text Tracks Format (WebVTT) description CMAF Switching Set (single Track); English timed text markup language (TTML) description CMAF Switching Set (single Track); French WebVTT dub CMAF Switching Set (single Track); and French TTML dub CMAF Switching Set (single Track). At 630, the video selection set comprises SD Media Profile CMAF Switching Set (multiple Tracks); HD Media Profile CMAF Switching Set (multiple Tracks); and UHD10 Media Profile CMAF Switching Set (multiple Tracks).

In a streaming environment, this avoids combinatorial complexity or useless downloads, as clients only select the relevant tracks for the current situation, and only downloads these tracks and does synchronized playout/playback. The HTML5 media source extension (MSE) based playback exactly permits this. However, by doing so, each track gets its own ISOBMFF/MP4 file and, consequently, all concepts of the file format are no longer applicable because the requirements for a file to have unique track identifiers is not carried forward; each file includes its own movie header, and relationship(s) about the tracks cannot be expressed.

In a streaming environment, the information that is contained in a movie header for many tracks may need to be populated to the manifest such that the client can, early on, select the tracks based on this information.

Features described herein may relate to one or more of the following issues. The content consumed during a playback session may not originate or be processed from the same entity; in such a case, a file packager may not be able to encapsulate all the media streams into a single ISOBMFF file. By having each track (media stream) in its own ISOBMFF/MP4 file, all concepts of the file format may no longer be followed, which may lead to erratic or unstable behavior from the file readers.

In the current ISOBMFF standard, in a ISOBMFF multi-track file, the track IDs are unique. In contrast, the CMAF standard currently requires the tracks of a CMAF switching set to have the identical track ID in all tracks. Therefore, in creating a CMAF switching set from a multi-track ISOBMFF file or vice versa, the track IDs may need to be changed to comply with the target standard.

The requirement for a ISOBMFF file to have unique track identifiers is also not carried forward. While each ISOBMFF file includes its own movie header, the relationship between the tracks cannot be expressed. Without the uniqueness established between tracks (media streams), a file reader may be ambiguous in selecting the tracks for playback; this may lead to unintended behavior at the playback end. Furthermore, it may cause confusion to the packager and file rewriter to pick the right tracks for its tasks.

A technical effect of example embodiments of the present disclosure may be to enable handling of media streams present in their own separate files.

A technical effect of example embodiments of the present disclosure may be to enable storage of a CMAF presentation in a multi-track MP4 file, and recovery of the CMAF presentation from this multi-track MP4 file. A technical effect of example embodiments of the present disclosure may be to enable, using the DASH Profile for CMAF content, generation of a DASH Media Presentation (MPD and Segments). Based on this, it may be possible to generate a DASH Media Presentation from a multi-track MP4 file. A technical effect of example embodiments of the present disclosure may be to enable offering of the same presentation options that the MPD offers in a local MP4, including bitrate variations (e.g. for debug purposes, battery efficiency use cases, etc.).

In general, with respect to the structural CMAF brand 'cmfl', it has been agreed that a CMAF track conforming to the CMAF structural brand 'cmfl' shall conform to constraints of the CMAF structural brand 'cmfc' and all remaining constraints in subclause 7.8 of ISO/IEC 23000-19. These constraints are introduced to signal that the CMAF track and CMAF switching set track headers are conforming, as if all CMAF Tracks of the presentation also conforming to this brand would be included in a single ISOBMFF file.

Turning to the Track Header Box ('tkhd'), it has been agreed that CMAF TrackHeaderBoxes shall conform to subclause 7.5.4 of ISO/IEC 23000-19 with the following additional constraints. The track_ID is set to a unique identifier over the entire lifetime of this CMAF presentation. All tracks within one CMAF Switching Set have alternate_group set to the same value. Each CMAF Switching Set in the CMAF Presentation has a unique value for the alternate_group. For a video track, every decoder output signal shall have decoded and cropped image size in video spatial samples measured on a uniformly sampled square grid identical to the value of width and height defined in the Track Header.

In the present disclosure, a unique ID may be defined as an identifier value that is derived with such a method that it makes it unlikely to have the same unique ID created in two or more instances unless specifically targeted. An example of a unique ID is a Universally Unique Identifier (UUID), which is usually a 128-bit number used to identify information in computer systems. There are several possible ways to derive a UUID. For example, a UUID may be derived from a media access control address (MAC address) of the device generating the UUID and a present time (e.g. in terms of Coordinated Universal Time). A part of a UUID may comprise a namespace ID owned by an organization, such as ISO. A part of a UUID may comprise or be derived from a random number or a pseudo-random number. Methods for deriving UUIDs have been specified in the Request for Comments (RFC) 4122 by the Internet Engineering Task Force (IETF). Embodiments may use any method or algorithm to derive a UUID. A unique ID in different embodiments may interchangeably be referred to as unique_ID, which may be regarded as a syntax element name and/or syntax element value.

In an example embodiment, a first bitstream and a second bitstream may be taken as input. In an example embodiment, a first file may be output, containing a first track which encapsulates or comprises the first bitstream, and a second file containing a second track which encapsulates or comprises the second bitstream. In an example embodiment, it may additionally be indicated that the first file carries one or more unique IDs. In an example embodiment, it may additionally be indicated that the second file carries one or more unique IDs. In an example embodiment, when one of the unique IDs carried in the first file and the second file matches, this may indicate that the first file and second file may be combined to obtain an ISOBMFF conforming file.

In an example embodiment, a first file and a second file may be taken as input. In an example embodiment, the first file may be parsed, and may contain a first track which encapsulates or comprises a first bitstream. In an example embodiment, the second file may be parsed, and may contain a second track which encapsulates or comprises a second bitstream. In an example embodiment, the first file may carry one or more (universally) unique IDs. In an example embodiment, the second file may carry one or more (universally) unique IDs. In an example embodiment, when one of the unique IDs carried in the first file and the second file matches, this may indicate that the first file and second file may be combined to obtain a ISOBMFF conforming file. In an example embodiment, if one of the unique IDs carried in the first file and the second file matches (i.e. is determined to be the same), the first file and the second file may be combined, and the combined file may be processed as a regular ISOBMFF file, which may comprise applying all the requirements applicable. In an example embodiment, during presentation at a given time instance, data (for example samples, chunks, fragments, segments) from only one of the tracks, among all the tracks in the combined ISOBMFF file, may be used. In an alternate example embodiment, during presentation at a given time instance, data (for example samples, chunks, fragments, segments) from a combination of the tracks among all the tracks in the combined ISOBMFF file may be used. In an example embodiment, the combination of tracks may be determined from different file format constructs, for example track reference, pre selection, tile based tracks, entity grouping, and so on, which are used for merging or extraction processes.

Example embodiments of the present disclosure may be applicable to a file packager/file rewriter. In an example embodiment, an entity (for example a file packager or file (re)writer) may provide an indication in the file format about the possibility of overlapping fields across different files. For example, track IDs may be repeated across files.

In an example embodiment, based on/in response to the indication of overlapping fields in file format, a file reader may be made aware that it should depend on additional information in the file format, besides the established identifiers (e.g. track ID), to establish uniqueness (i.e. because at least one indication in a first file matches at least one indication in a second file).

In an example embodiment, a unique_ID may be present at the media level/movie level of the file. In an example embodiment, the unique_ID may be present in the extension of movie header box. The movie header box may be extended either using the version parameter or the flags. For example, unique_ID may be signaled in a MovieHeaderBox having a version equal to 2. Referring now to FIG. 7, illustrated is an example of the syntax of MovieHeaderBox.

In an alternative example embodiment, a unique_ID (710) may be present in a movie header extension box. The movie header extension box may be a companion box to the movie header box. The movie header extension box may immediately follow the movie header box in a movie box.

In an alternative example embodiment, a unique_ID may be present in a new box, which may be called an origin box. The origin box may be a companion box to the movie header box, track header box, or meta box. The origin box may immediately follow one of those boxes.

Referring now to FIG. 8, an example file format implementation of the movie header extension box is illustrated. The movie header extension box may be denoted by 4cc 'mvhe' (810); alternatively, any other 4cc may be used. unique_ids count minus1 (720, 820) plus 1 may indicate the number of unique IDs present in the file. unique_ID[i] (710, 830) may be an i-th non-zero integer that may indicate a unique value for the movie in the current file.

In an example embodiment, the unique_ID (710, 830) may be obtained by using timing information to establish uniqueness. The timing information may be, for example, the present time of a certain event or process. For example, the present time may be obtained at the start of the process to generate all the files containing the unique ID, or be the capture time when the recording of the original media sequence started. The timing information may be used to generate a unique ID, such as a UUID. For example, the timing information may be used as a seed or an input argument for generating the unique ID, or a part of the unique ID may comprise the timing information.

In an example embodiment, the unique_ID (710, 830) may be a Universal Unique Identifier (UUID).

In an alternative example embodiment, the unique_ID (710, 830) may be a random number generated from the operating system including the time of creation of the field. For example, the present time may be used as a seed value for the random number generator. Any unique random number generation process may be used; examples may include signal noise in a chip, or even lately used quantum processes.

In an example embodiment, if a track needs to be consumed by two or more different presentations, multiple unique_IDs may be present in the file, where each unique_ID may be mapped to a different presentation. For example, an audio track may contain background music, which may be mapped to different video presentations, i.e. combined with different video tracks. Thus, the file containing the audio track may contain the unique_ID values of all the possible video presentations.

In an example embodiment, if no such unique_ID field is present, then there may be no promise that the two files can be combined together for the conformance point. In other words, the absence of a unique_ID field may indicate that combination of two files is not allowed.

In an example embodiment, a default value for the unique_ID field may be defined.

In an example embodiment, when two or more files have the same unique_ID, it may indicate that the two or more files can be combined together.

In an example embodiment, when two files have different unique_IDs, it may indicate that the two files cannot be combined together.

In an example embodiment, a file writer may indicate in the file if/whether track group IDs apply across files, meaning that a track group of a particular track group ID may comprise the tracks mapped to that track group ID in all the files having the same unique ID value. For example, when two or more files have the same Unique ID, the file writer may ensure that the track group IDs apply across these files (i.e., when a first track in a first file is indicated to belong to a track group with ID equal to trGrId and a second track in a second file is indicated to belong to a track group ID equal to the same trGrId, then the first track and the second track may belong to the same track group). Alternatively, a box header flag of a track group box, when equal to 1, may indicate that the track group applies across files that have the same Unique ID.

In an example embodiment, (flags & 0x000002) equal to 1 in a TrackGroupTypeBox of a particular track_group_type may indicate that the track group of a particular track_group_type applies across files that have the same Unique ID.

In an example embodiment, a box header flag of a track group box may indicate, when equal to 1, that the track group applying across files contains tracks of the same track ID. This box header flag may be the same as or different from a box header flag that may indicate that the track group applies across files that have the same Unique ID.

In an example embodiment, (flags & 0x000004) equal to 1 in a TrackGroupTypeBox of a particular track_group_type may indicate that the track group of a particular track_group_type applies across files that have the same Unique ID, and may contain tracks of the same track ID.

In an example embodiment, when two or more files have the same Unique ID, and track groups are indicated to apply across the two or more files, and a switch track group is indicated to contain tracks of the same track ID, it may indicate to the packager that the two or more files may be combined, provided that samples and respective metadata from only a single track of the switch track group, for any time period, is included in the combined file. A switch track group may be defined as a track group that comprises tracks among which only a single track may be selected for playback for any time instant, and between which a player may switch, for example based on the bitrate of the track compared to the network throughput over which the track(s) are being streamed, or based on the resolution of the video track compared to the resolution of the display window.

In an example embodiment, a file writer may indicate the method of combining in the same syntax structure a Unique ID. The method of combining may, for example, be an indicator value configured to indicate which of the pre-defined methods may be used. The pre-defined methods may comprise at least: 1) including all boxes and media data from the files with the same Unique ID in respective container boxes; and 2) when two or more files having the same Unique ID and track groups are indicated to apply across the two or more files, and a switch track group is indicated to contain tracks of the same track ID, the two or more files may be combined so that samples and respective metadata from only a single track of the switch track group, for any time period, may be included in the combined file.

In an example embodiment, unique IDs may be present in a new file-level box, which may be called the file annotation box. The syntax of the file annotation box may be similar to the movie header extension box. The file annotation box may be accompanied in all the segments of the file. For example, the file annotation box may be present in the initialization segment, and in all other subsequent segments of the file. This may have the technical effect of providing the file reader a finer granularity for combining data from different files on a segment by segment basis.

In an alternative example embodiment, the unique IDs may be present in a new box under movie fragments called the movie fragment header extension box. The movie fragment header extension box may be a companion box to the movie fragment header box. Alternatively, the movie fragment header box may be extended, either using a new version, or using the flags to carry the unique IDs. This may have the technical effect of providing the file reader a finer granularity for combining data from different files on a segment by segment basis.

Example embodiments of the present disclosure may be applicable to a file packager/file rewriter. A technical effect of example embodiments of the present disclosure may be maintenance of uniqueness. An entity which is present before the packaging/packager may combine different tracks/entities present in different files to provide a unique presentation. The combining method may have the technical effect of making sure that all the tracks in different files have unique track id. Additionally or alternatively, the combining method may have the technical effect of making sure that all the entities in different files have unique entity id (for example item ID). Additionally or alternatively, the combining method may have the technical effect of making sure that unique track group IDs are used if tracks are part of a track group. Additionally or alternatively, the combining method may have the technical effect of making sure that unique entity IDs are used if tracks or entities are part of an entity group. Additionally or alternatively, the combining method may have the technical effect of making sure that track references point to the right tracks or track groups. One or more of the foregoing may be ensured via rewriting of all the fields where ID values are used.

In an example embodiment, uniqueness may not be used, for example, in CMAF, as there is a requirement for the tracks to have the same track ID value when they belong to a switching group. In an example embodiment, the entity (e.g. file packager or file rewriter) may perform visual inspection (e.g. using PSNR) to identify tracks of visually similar content between one or more files. When visual inspection identifies similar tracks, the same track-ids may be assigned for the identified tracks in the switching group. In an example embodiment, further mechanisms may exist to identify correspondence between texture and depth information. For example in the case of volumetric content, where geometry and texture are stored in different files, an inspection can take into account information from track headers and sample entry. Also, visual inspection may be performed to determine a relationship between files that may be indicated.

FIG. 9 illustrates the potential steps of an example method 900. The example method 900 may include: obtaining a first bitstream and a second bitstream, 910; generating a first file comprising a first track and one or more identifiers associated with the first file, wherein the first track comprises the first bitstream, 920; and generating a second file comprising a second track and one or more identifiers associated with the second file, wherein the second track comprises the second bitstream, wherein at least one of the one or more identifiers associated with the first file matches at least one of the one or more identifiers associated with the second file, wherein a match between the at least one of the one or more identifiers associated with the first file and the at least one of the one or more identifiers associated with the second file is configured to indicate that the first file is capable of combination with the second file, 930. The example method 900 may be performed, for example, with a UE and/or network entity that is capable of performing the function of a file packager and/or file writer and/or file rewriter.

Figure 10:
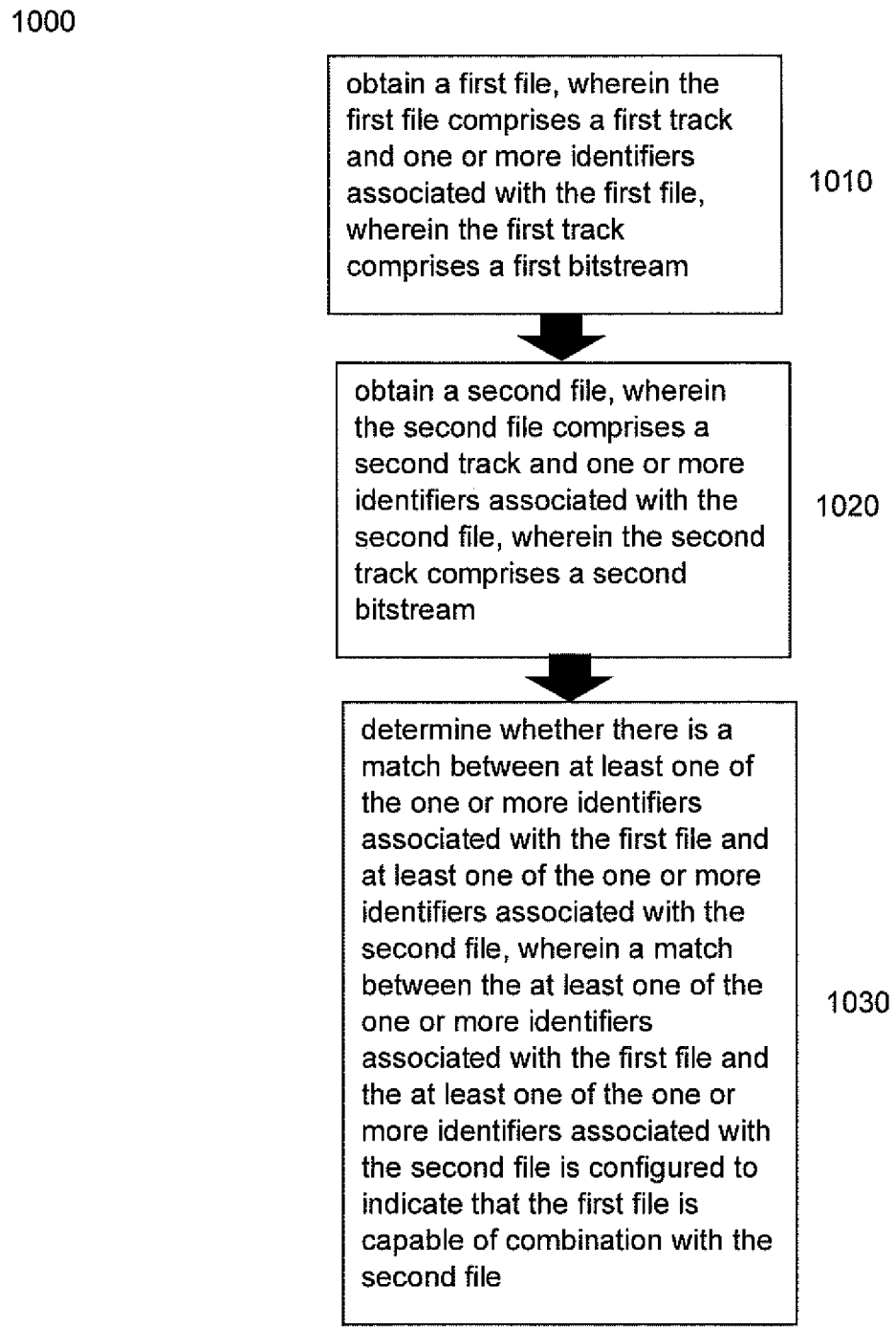
FIG. 10 is a flowchart illustrating steps as described herein.

FIG. 10 illustrates the potential steps of an example method 1000. The example method 1000 may include: obtaining a first file, wherein the first file comprises a first track and one or more identifiers associated with the first file, wherein the first track comprises a first bitstream, 1010; obtaining a second file, wherein the second file comprises a second track and one or more identifiers associated with the second file, wherein the second track comprises a second bitstream, 1020; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file is configured to indicate that the first file is capable of combination with the second file, 1030. The example method 1000 may be performed, for example, with a UE and/or network entity that is capable of performing the function of a receiver/renderer.

In accordance with one example embodiment, an apparatus may comprise: at least one processor; and at least one memory storing instructions that, when executed by the at least one processor, cause the apparatus at least to: obtain a first bitstream and a second bitstream; generate a first file comprising a first track and one or more identifiers associated with the first file, wherein the first track may comprise the first bitstream; and generate a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

The example apparatus may be further configured to: determine the one or more identifiers associated with the first file and the one or more identifiers associated with the second file based, at least partially, on timing information.

At least one of the one or more identifiers associated with the first file or the one or more identifiers associated with the second file may comprise one of: a universal unique identifier, a randomly generated number, or a default value.

The example apparatus may be further configured to: determine that the first track and the second track belong to a same track group.

The example apparatus may be further configured to: provide an indication that the match between the at least one of the one or more identifiers associated with the first file and the at least one of the one or more identifiers associated with the second file may be configured to indicate that a same track group applies to the first file and the second file.

The example apparatus may be further configured to: provide an indication that a same track group applies to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The example apparatus may be further configured to: determine that the first file may be capable of combination with the second file in response to: the match between the at least one of the one or more identifiers associated with the first file and the at least one of the one or more identifiers associated with the second file, an indication that track groups may apply across the first file and the second file, an indication that a switch track group may contain tracks comprising a same track identifier, and a combination of the first file and the second file may comprise a single track of the switch track group at a time period.

The example apparatus may be further configured to: provide an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

In accordance with one aspect, an example method may be provided comprising: obtaining a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

The example method may further comprise: determining the one or more identifiers associated with the first file and the one or more identifiers associated with the second file based, at least partially, on timing information.

At least one of the one or more identifiers associated with the first file or the one or more identifiers associated with the second file may comprise one of: a universal unique identifier, a randomly generated number, or a default value.

The example method may further comprise: determining that the first track and the second track belong to a same track group.

The example method may further comprise: providing an indication that the match between the at least one of the one or more identifiers associated with the first file and the at least one of the one or more identifiers associated with the second file may be configured to indicate that a same track group applies to the first file and the second file.

The example method may further comprise: providing an indication that a same track group applies to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The example method may further comprise: determining that the first file may be capable of combination with the second file in response to: the match between the at least one of the one or more identifiers associated with the first file and the at least one of the one or more identifiers associated with the second file, an indication that track groups may apply across the first file and the second file, an indication that a switch track group may contain tracks comprising a same track identifier, and a combination of the first file and the second file may comprise a single track of the switch track group at a time period.

The example method may further comprise: providing an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

In accordance with one example embodiment, an apparatus may comprise: circuitry configured to perform: obtaining a first bitstream and a second bitstream; circuitry configured to perform: generating a first file comprising a first track and one or more identifiers associated with the first file, wherein the first track may comprise the first bitstream; and circuitry configured to perform: generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, an apparatus may comprise: processing circuitry; memory circuitry including computer program code, the memory circuitry and the computer program code configured to, with the processing circuitry, enable the apparatus to: obtain a first bitstream and a second bitstream; generate a first file comprising a first track and one or more identifiers associated with the first file, wherein the first track may comprise the first bitstream; and generate a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: obtaining a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

The means may be further configured to perform: determining the one or more identifiers associated with the first file and the one or more identifiers associated with the second file based, at least partially, on timing information.

At least one of the one or more identifiers associated with the first file or the one or more identifiers associated with the second file may comprise one of: a universal unique identifier, a randomly generated number, or a default value.

The means may be further configured to perform: determining that the first track and the second track belong to a same track group.

The means may be further configured to perform: providing an indication that the match between the at least one of the one or more identifiers associated with the first file and the at least one of the one or more identifiers associated with the second file may be configured to indicate that a same track group applies to the first file and the second file.

The means may be further configured to perform: providing an indication that a same track group may apply to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The means may be further configured to perform: determining that the first file may be capable of combination with the second file in response to: the match between the at least one of the one or more identifiers associated with the first file and the at least one of the one or more identifiers associated with the second file, an indication that track groups may apply across the first file and the second file, an indication that a switch track group may contain tracks comprising a same track identifier, and a combination of the first file and the second file may comprise a single track of the switch track group at a time period.

The means may be further configured to perform: providing an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause obtaining of a first bitstream and a second bitstream; generate a first file comprising a first track and one or more identifiers associated with the first file, wherein the first track may comprise the first bitstream; and generate a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, a non-transitory computer-readable medium comprising program instructions stored thereon for performing at least the following: causing obtaining of a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with another example embodiment, a non-transitory program storage device readable by a machine may be provided, tangibly embodying instructions executable by the machine for performing operations, the operations comprising: causing obtaining of a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with another example embodiment, a non-transitory computer-readable medium comprising instructions that, when executed by an apparatus, cause the apparatus to perform at least the following: causing obtaining of a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

A computer implemented system comprising: at least one processor and at least one non-transitory memory storing instructions that, when executed by the at least one processor, cause the system at least to perform: causing obtaining of a first bitstream and a second bitstream; generating a first file comprising a first track and one or more identifiers associated with the first file, wherein the first track may comprise the first bitstream; and generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

A computer implemented system comprising: means for causing obtaining of a first bitstream and a second bitstream; means for generating a first file comprising a first track and one or more identifiers associated with the first file, wherein the first track may comprise the first bitstream; and means for generating a second file comprising a second track and one or more identifiers associated with the second file, wherein the second track may comprise the second bitstream, wherein at least one of the one or more identifiers associated with the first file may match at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, an apparatus may comprise: at least one processor; and at least one memory storing instructions that, when executed by the at least one processor, cause the apparatus at least to: obtain a first file, wherein the first file may comprise a first track and one or more identifiers associated with the first file, wherein the first track may comprise a first bitstream; obtain a second file, wherein the second file may comprise a second track and one or more identifiers associated with the second file, wherein the second track may comprise a second bitstream; and determine whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

The example apparatus may be further configured to: combine the first file and the second file to generate a combined file in response to a determination that there may be a match between the at least one of the one or more identifiers associated with the first file and the at least one of the one or more identifiers associated with the second file; and process the combined file based, at least partially, on at least one requirement associated with a predetermined file format.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

At least one of the one or more identifiers associated with the first file or the one or more identifiers associated with the second file may comprise one of: a universal unique identifier, a randomly generated number, or a default value.

The example apparatus may be further configured to: obtain an indication that the match between the at least one of the one or more identifiers associated with the first file and the at least one of the one or more identifiers associated with the second file may be configured to indicate that a same track group applies to the first file and the second file.

The example apparatus may be further configured to: obtain an indication that a same track group may apply to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The example apparatus may be further configured to: obtain an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

In accordance with one aspect, an example method may be provided comprising: obtaining a first file, wherein the first file may comprise a first track and one or more identifiers associated with the first file, wherein the first track may comprise a first bitstream; obtaining a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

The example method may further comprise: combining the first file and the second file to generate a combined file in response to a determination that there is a match between the at least one of the one or more identifiers associated with the first file and the at least one of the one or more identifiers associated with the second file; and processing the combined file based, at least partially, on at least one requirement associated with a predetermined file format.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

At least one of the one or more identifiers associated with the first file or the one or more identifiers associated with the second file may comprise one of: a universal unique identifier, a randomly generated number, or a default value.

The example method may further comprise: obtaining an indication that the match between the at least one of the one or more identifiers associated with the first file and the at least one of the one or more identifiers associated with the second file may be configured to indicate that a same track group applies to the first file and the second file.

The example method may further comprise: obtaining an indication that a same track group applies to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The example method may further comprise: obtaining an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

In accordance with one example embodiment, an apparatus may comprise: circuitry configured to perform: obtaining a first file, wherein the first file may comprise a first track and one or more identifiers associated with the first file, wherein the first track may comprise a first bitstream; circuitry configured to perform: obtaining a second file, wherein the second file may comprise a second track and one or more identifiers associated with the second file, wherein the second track may comprise a second bitstream; and circuitry configured to perform: determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, an apparatus may comprise: processing circuitry; memory circuitry including computer program code, the memory circuitry and the computer program code configured to, with the processing circuitry, enable the apparatus to: obtain a first file, wherein the first file may comprise a first track and one or more identifiers associated with the first file, wherein the first track may comprise a first bitstream; obtain a second file, wherein the second file may comprise a second track and one or more identifiers associated with the second file, wherein the second track may comprise a second bitstream; and determine whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, an apparatus may comprise means for performing: obtaining a first file, wherein the first file may comprise a first track and one or more identifiers associated with the first file, wherein the first track may comprise a first bitstream; obtaining a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

The means may be further configured to perform: combining the first file and the second file to generate a combined file in response to a determination that there is a match between the at least one of the one or more identifiers associated with the first file and the at least one of the one or more identifiers associated with the second file; and processing the combined file based, at least partially, on at least one requirement associated with a predetermined file format.

The match between the at least one of the one or more identifiers associated with the first file and the at least one of the one or more identifiers associated with the second file may be configured to indicate that the first file is capable of combination with the second file to generate a file conforming with a predetermined file format.

The first file and the second file may further comprise one or more matching track identifiers.

The one or more identifiers associated with the first file may comprise one or more identifiers at one of a media level or a movie level of the first file, wherein the one or more identifiers associated with the second file may comprise one or more identifiers at one of a media level or a movie level of the second file.

The one or more identifiers associated with the first file may be included in one of: a movie header box, a movie header extension box, an origin box, a file level box, a file annotation box, or a movie fragment header extension box.

At least one of the one or more identifiers associated with the first file or the one or more identifiers associated with the second file may comprise one of: a universal unique identifier, a randomly generated number, or a default value.

The means may be further configured to perform: obtaining an indication that the match between the at least one of the one or more identifiers associated with the first file and the at least one of the one or more identifiers associated with the second file may be configured to indicate that a same track group applies to the first file and the second file.

The means may be further configured to perform: obtaining an indication that a same track group may apply to the first file and the second file in response to: the match between the at least one of the one or more identifiers associated with the first file and the at least one of the one or more identifiers associated with the second file, and a match between a track identifier of at least one track of the first file and a track identifier of at least one track of the second file.

The means may be further configured to perform: obtaining an indication of a method for combining the first file and the second file.

The method for combining the first file and the second file may comprise one of: combination of boxes and media data from the first file and the second file, respectively, or combination of samples and metadata of the first file for a first time period with samples and metadata of the second file for a second, different time period.

Respective tracks of the first file may have unique track identifiers, wherein respective tracks of the second file may have unique track identifiers.

Respective entities of the first file may have unique entity identifiers, wherein respective entities of the second file may have unique entity identifiers.

The first file may comprise at least one unique track group identifier in response to at least one track of the first file belonging to a track group.

The first file may comprise at least one unique entity identifier in response to at least one track of the first file belonging to an entity group.

The first file may comprise at least one track reference.

In accordance with one example embodiment, a non-transitory computer-readable medium comprising instructions stored thereon which, when executed with at least one processor, cause the at least one processor to: cause obtaining of a first file, wherein the first file may comprise a first track and one or more identifiers associated with the first file, wherein the first track may comprise a first bitstream; cause obtaining of a second file, wherein the second file may comprise a second track and one or more identifiers associated with the second file, wherein the second track may comprise a second bitstream; and determine whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with one example embodiment, a non-transitory computer-readable medium comprising program instructions stored thereon for performing at least the following: causing obtaining of a first file, wherein the first file may comprise a first track and one or more identifiers associated with the first file, wherein the first track may comprise a first bitstream; causing obtaining of a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with another example embodiment, a non-transitory program storage device readable by a machine may be provided, tangibly embodying instructions executable by the machine for performing operations, the operations comprising: causing obtaining of a first file, wherein the first file may comprise a first track and one or more identifiers associated with the first file, wherein the first track may comprise a first bitstream; causing obtaining of a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

In accordance with another example embodiment, a non-transitory computer-readable medium comprising instructions that, when executed by an apparatus, cause the apparatus to perform at least the following: causing obtaining of a first file, wherein the first file may comprise a first track and one or more identifiers associated with the first file, wherein the first track may comprise a first bitstream; causing obtaining of a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

A computer implemented system comprising: at least one processor and at least one non-transitory memory storing instructions that, when executed by the at least one processor, cause the system at least to perform: causing obtaining of a first file, wherein the first file may comprise a first track and one or more identifiers associated with the first file, wherein the first track may comprise a first bitstream; causing obtaining of a second file, wherein the second file may comprise a second track and one or more identifiers associated with the second file, wherein the second track may comprise a second bitstream; and determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

A computer implemented system comprising: means for causing obtaining of a first file, wherein the first file may comprise a first track and one or more identifiers associated with the first file, wherein the first track may comprise a first bitstream; means for causing obtaining of a second file, wherein the second file may comprise a second track and one or more identifiers associated with the second file, wherein the second track may comprise a second bitstream; and means for determining whether there is a match between at least one of the one or more identifiers associated with the first file and at least one of the one or more identifiers associated with the second file, wherein a match between the at least one of the one or more identifiers associated with the first file and the at least one of the one or more identifiers associated with the second file may be configured to indicate that the first file is capable of combination with the second file.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory storing instructions that, when executed with the at least one processor, cause the apparatus at least to:

generate a first file comprising, at least, a first track and one or more first identifiers; and generate a second file comprising, at least, a second track and one or more second identifiers, wherein at least one of the one or more first identifiers in the first file matches at least one of the one or more second identifiers in the second file, wherein a match between the at least one of the one or more first identifiers in the first file and the at least one of the one or more second identifiers in the second file is configured to indicate that the first file is capable of combination with the second file to generate a combined file conforming with a predetermined file format, wherein the combined file comprises, at least, at least part of the first track of the first file and at least part of the second track of the second file, wherein a format of at least one of the first file or the second file is at least partially different from the predetermined file format, wherein, in response to a determination that there is the match between the at least one of the one or more first identifiers in the first file and the at least one of the one or more second identifiers in the second file, at least one of:

the combined file is configured to be generated via combining of the first file and the second file, or the at least part of the first track and the at least part of the second track are configured to be rendered.

2. The apparatus of claim 1, wherein the predetermined file format comprises an ISO base media file format.

3. The apparatus of claim 1, wherein the match between the at least one of the one or more first identifiers in the first file and the at least one of the one or more second identifiers in the second file is configured to indicate that samples from at least one of the first track or the second track are used to generate the combined file conforming with the predetermined file format.

4. The apparatus of claim 1, wherein the one or more first identifiers in the first file comprise one or more identifiers at one of a media level or a movie level of the first file, wherein the one or more second identifiers in the second file comprise one or more identifiers at one of a media level or a movie level of the second file.

5. The apparatus of claim 1, wherein the one or more first identifiers in the first file are included in one of:

a movie header box, a movie header extension box, an origin box, a file level box, a file annotation box, or a movie fragment header extension box.

6. The apparatus of claim 1, wherein the first file comprises an indication of a number of the one or more first identifiers in the first file, or the second file comprises an indication of a number of the one or more second identifiers in the second file.

7. The apparatus of claim 1, wherein at least one of the one or more first identifiers in the first file or the one or more second identifiers in the second file comprises one of:
- a universal unique identifier,
- a randomly generated number, or
- a default value.

8. The apparatus of claim 1, wherein the at least one memory stores instructions that, when executed by the at least one processor, cause the apparatus to:
- provide an indication of a method for combining the first file and the second file.

9. The apparatus of claim 1, wherein the match between the at least one of the one or more first identifiers in the first file and the at least one of the one or more second identifiers in the second file is configured to indicate that the first file is capable of combination with the second file via one of:
- combination of boxes and media data from the first file and the second file, respectively, or
- combination of samples and metadata of the first file for a first time period with samples and metadata of the second file for a second, different time period.

10. The apparatus of claim 1, wherein the at least one memory stores instructions that, when executed by the at least one processor, cause the apparatus to:
- generate a third file comprising a third track and one or more third identifiers,
- wherein an identifier of the one or more first identifiers in the first file matches an identifier of the one or more third identifiers in the third file, wherein the match between the identifier of the one or more first identifiers in the first file and the identifier of the one or more third identifiers in the third file is configured to indicate that the first file is capable of combination with the third file to generate a further combined file conforming with the predetermined file format,
- wherein a presentation represented with the generated combined file is at least partially different from a presentation represented with the further generated combined file.

11. A method comprising:
- generating a first file comprising, at least, a first track and one or more first identifiers; and
- generating a second file comprising, at least, a second track and one or more second identifiers,
- wherein at least one of the one or more first identifiers in the first file matches at least one of the one or more second identifiers in the second file, wherein a match between the at least one of the one or more first identifiers in the first file and the at least one of the one or more second identifiers in the second file is configured to indicate that the first file is capable of combination with the second file to generate a combined file conforming with a predetermined file format, wherein the combined file comprises, at least, at least part of the first track of the first file and at least part of the second track of the second file,
- wherein a format of at least one of the first file or the second file is at least partially different from the predetermined file format,
- wherein, in response to a determination that there is the match between the at least one of the one or more first identifiers in the first file and the at least one of the one or more second identifiers in the second file, at least one of:
  - the combined file is configured to be generated via combining of the first file and the second file, or
  - the at least part of the first track and the at least part of the second track are configured to be rendered.

12. An apparatus comprising:
- at least one processor; and
- at least one memory storing instructions that, when executed with the at least one processor, cause the apparatus at least to:
  - obtain a first file, wherein the first file comprises, at least, a first track and one or more first identifiers;
  - obtain a second file, wherein the second file comprises, at least, a second track and one or more second identifiers;
  - determine whether there is a match between at least one of the one or more first identifiers in the first file and at least one of the one or more second identifiers in the second file, wherein a match between the at least one of the one or more first identifiers in the first file and the at least one of the one or more second identifiers in the second file is configured to indicate that the first file is capable of combination with the second file to generate a combined file conforming with a predetermined file format, wherein the combined file comprises, at least, at least part of the first track of the first file and at least part of the second track of the second file,
  - wherein a format of at least one of the first file or the second file is at least partially different from the predetermined file format; and
  - in response to a determination that there is the match between the at least one of the one or more first identifiers in the first file and the at least one of the one or more second identifiers in the second file, one of:
    - combine the first file and the second file to generate the combined file, or
    - render the at least part of the first track and the at least part of the second track.

13. The apparatus of claim 12, wherein the at least one memory stores instructions that, when executed by the at least one processor, cause the apparatus to:
- combine the first file and the second file to generate the combined file in response to a determination that there is the match between the at least one of the one or more first identifiers in the first file and the at least one of the one or more second identifiers in the second file; and
- process the combined file based, at least partially, on at least one requirement associated with the predetermined file format.

14. The apparatus of claim 12, wherein the predetermined file format comprises an ISO base media file format.

15. The apparatus of claim 12, wherein the one or more first identifiers in the first file comprise one or more identifiers at one of a media level or a movie level of the first file, wherein the one or more second identifiers in the second file comprise one or more identifiers at one of a media level or a movie level of the second file.

16. The apparatus of claim 12, wherein at least one of the one or more first identifiers in the first file or the one or more second identifiers in the second file comprises one of
- a universal unique identifier,
- a randomly generated number, or
- a default value.

17. The apparatus of claim 12, wherein the at least one memory stores instructions that, when executed by the at least one processor, cause the apparatus to:
- obtain an indication that a same track group applies to the first file and the second file in response to:

the match between the at least one of the one or more first identifiers in the first file and the at least one of the one or more second identifiers in the second file, and a match between a track identifier of at least one track of the first file and a track identifier of at least one track of the second file.

18. The apparatus of claim 12, wherein the at least one memory stores instructions that, when executed by the at least one processor, cause the apparatus to:

obtain an indication of a method for combining the first file and the second file.

19. The apparatus of claim 18, wherein the match between the at least one of the one or more first identifiers in the first file and the at least one of the one or more second identifiers in the second file is configured to indicate that the first file is capable of combination with the second file via one of:

combination of boxes and media data from the first file and the second file, respectively, or combination of samples and metadata of the first file for a first time period with samples and metadata of the second file for a second, different time period.

20. A method comprising:

obtaining a first file, wherein the first file comprises, at least, a first track and one or more first identifiers;

obtaining a second file, wherein the second file comprises, at least, a second track and one or more second identifiers;

determining whether there is a match between at least one of the one or more first identifiers in the first file and at least one of the one or more second identifiers in the second file, wherein a match between the at least one of the one or more first identifiers in the first file and the at least one of the one or more second identifiers in the second file is configured to indicate that the first file is capable of combination with the second file to generate a combined file conforming with a predetermined file format, wherein the combined file comprises, at least, at least part of the first track of the first file and at least part of the second track of the second file, wherein a format of at least one of the first file or the second file is at least partially different from the predetermined file format; and in response to a determination that there is the match between the at least one of the one or more first identifiers in the first file and the at least one of the one or more second identifiers in the second file, one of:

combining the first file and the second file to generate the combined file, or rendering the at least part of the first track and the at least part of the second track.

* * * * *